E. SCHNEIDER.
COMBINED RECUPERATOR AND RECOIL BRAKE APPARATUS FOR GUNS.
APPLICATION FILED FEB. 14, 1918.
1,310,893.
Patented July 22, 1919.
3 SHEETS—SHEET 1.
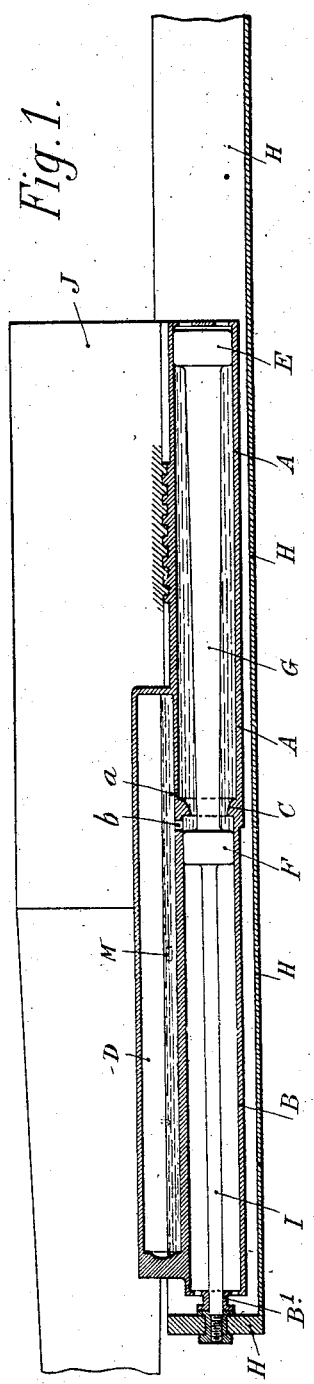
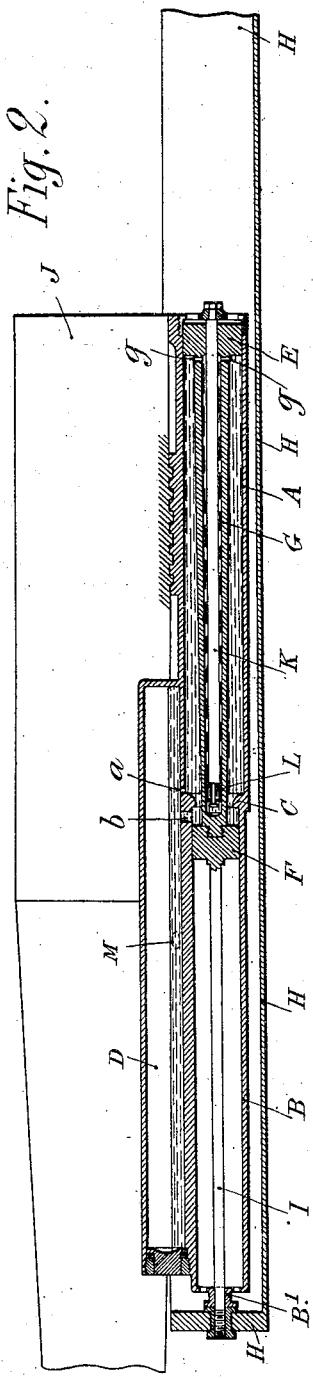
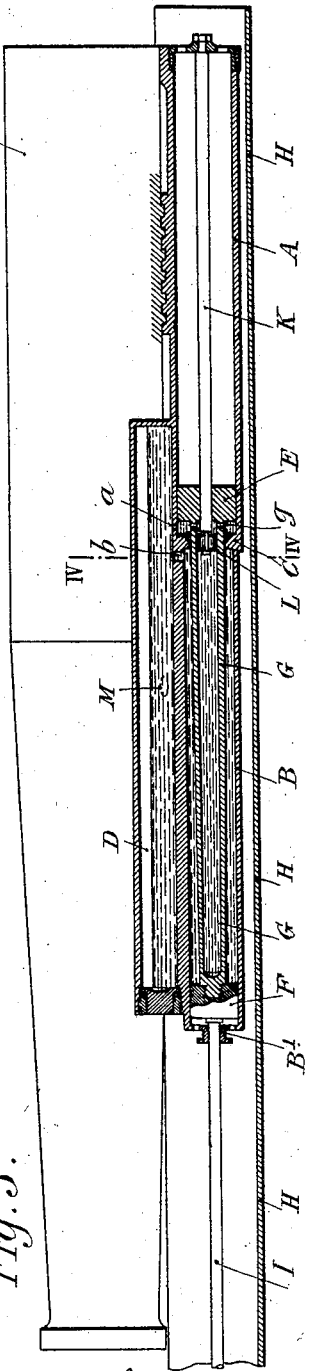

E. SCHNEIDER.
COMBINED RECUPERATOR AND RECOIL BRAKE APPARATUS FOR GUNS.
APPLICATION FILED FEB. 14, 1918.
1,310,893.
Patented July 22, 1919.
3 SHEETS—SHEET 2.
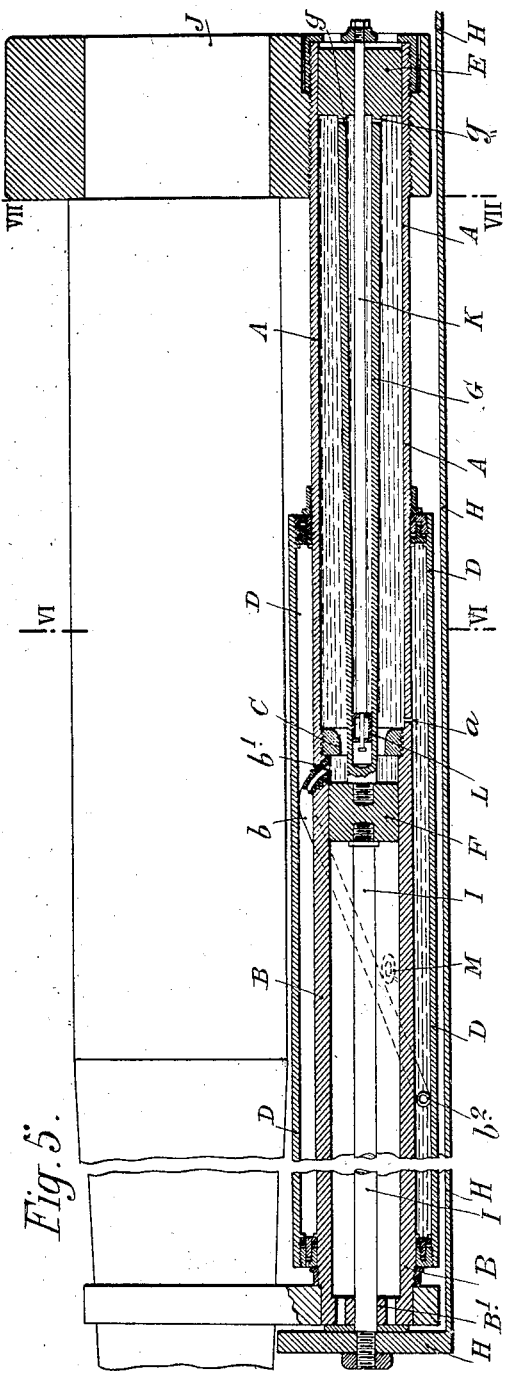
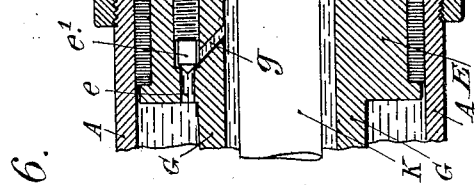
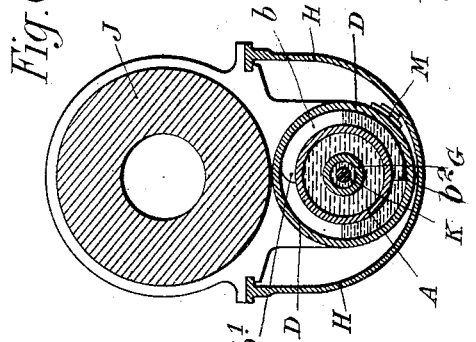
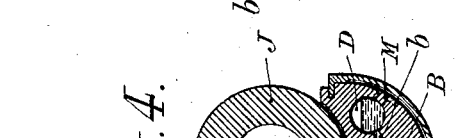
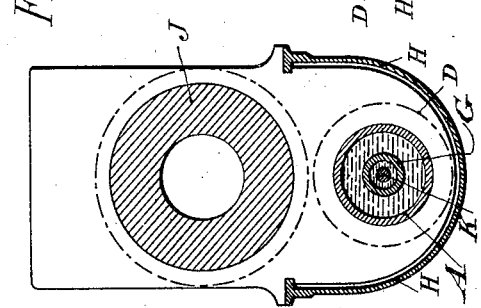

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT STOCK COMPANY OF FRANCE.

COMBINED RECUPERATOR AND RECOIL-BRAKE APPARATUS FOR GUNS.

1,310,893.   Specification of Letters Patent.   Patented July 22, 1919.

Application filed February 14, 1918. Serial No. 217,200.

*To all whom it may concern:*

Be it known that I, EUGÈNE SCHNEIDER, a citizen of the French Republic, and a resident of 42 Rue d' Anjou, Paris, France, have invented new and useful Improvements in Combined Recuperator and Recoil-Brake Apparatus for Guns, which invention is fully set forth in the following specification.

This invention has for its object to provide an improved hydro-pneumatic recuperator so constructed that the greater part of its elements shall be able at the same time to constitute the essential elements of a hydraulic recoil brake.

For this purpose, according to the invention, the movable or fixed cylinder in which the recuperator piston works, is composed of two elements of different bores arranged coaxially in line with each other, with a partition having a central orifice located between the said two bores. The said piston is divided into two pistons respectively at the ends of a peculiarly shaped rod, and their diameters correspond respectively to the bores of the cylinder elements. The element having the smaller bore communicates with the reservoir of air or gas under pressure, at a point near the partition. By reason of this construction the whole thus constituted works as a recuperator owing to the forcing back of the liquid that takes place during the recoil, toward the compressed air or gas reservoir, from the element having the greater bore, through the element having the smaller bore. The said whole operates at the same time as a recoil brake owing to the throttling of the liquid between the shaped rod that connects the two pistons, and the sides of the orifice in the partition formed between the two cylinder elements.

In practice it is easy to combine the conjugated recuperator and brake apparatus with a "moderator" (that is to say, a device for regulating the running out movement of the gun into the firing position) by utilizing for this purpose the rod connecting the two pistons. For this purpose the said rod is suitably hollowed to form a liquid chamber relatively to which a counter-rod is adapted to move which is fixed to the recuperator cylinder. The said rod is to be provided with the usual valve.

The above described combination allows of a complete and constant charge of the hydraulic brake while rendering it possible for the liquid in the latter to expand owing to the constant communication between the brake cylinder and the air reservoir of the recuperator.

Various embodiments of this invention are illustrated by way of example in the accompanying drawings in which:—

Figure 1 is a diagrammatic longitudinal section partly in elevation illustrating the principle of construction of the improved combined brake and recuperator.

Figs. 2 to 4 illustrate the combination of the apparatus shown in Fig. 1, with a moderator for regulating the running out of the gun into the firing position.

Fig. 2 is a longitudinal axial section of the improved apparatus showing the parts in the positions when the gun is run out.

Fig. 3 is a similar section, showing the parts in their positions at the end of the recoil.

Fig. 4 is a cross section on the line IV—IV of Fig. 3.

Fig. 5 is a longitudinal axial section partly in elevation, illustrating another embodiment of the invention.

Figs. 6 and 7 are cross sections respectively on the lines VI—VI and VII—VII of Fig. 5.

Fig. 8 is a detail section of a portion of the improved apparatus.

Figure 9:
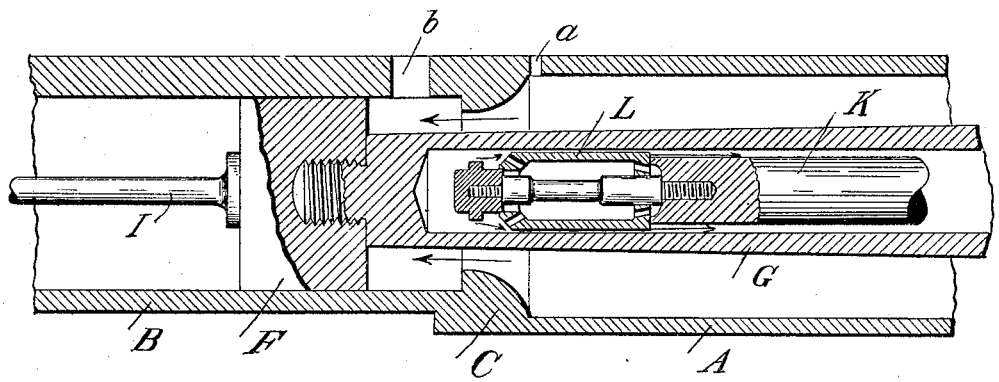
Fig. 9 is a detail view in longitudinal vertical section showing the position of the valve L on the counter rod K during return to battery.
Figure 10:
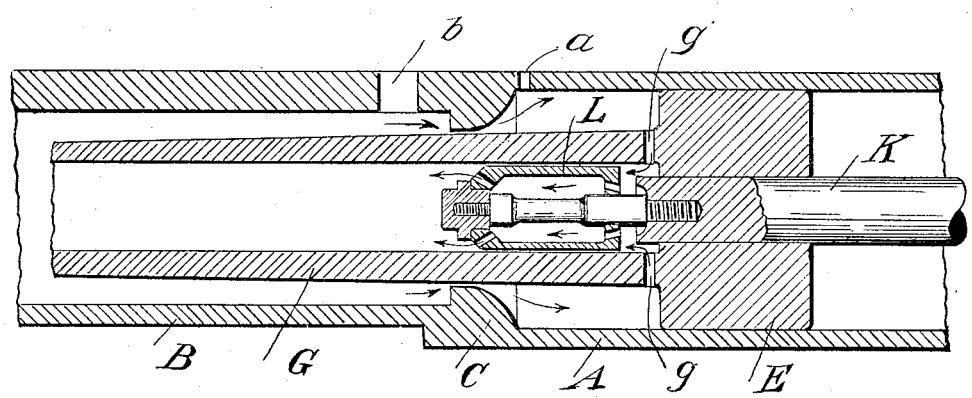
Fig. 10 is a similar detail view during recoil.

Referring now to Fig. 1, in this diagrammatic figure it is assumed, as also in the hereinafter described embodiments, that the conjugated pistons are fixed to a fixed part of the gun (for instance the gun cradle), and that the whole of the double-bore cylinder and the compressed air or gas reservoir, are fixed to the recoiling part of the gun (for instance the sliding carriage of the gun). The improved apparatus comprises a cylinder A—B composed of two elements having different bores located coaxially in line with each other. C is a partition which is pierced with a central orifice and separates the cylinder element A having the larger bore from the cylinder element B having the smaller bore.

D is a reservoir located above the cylinder

A—B and communicating with the small bore cylinder element B through a duct $b$ provided near the partition C. $a$ is a small discharge orifice which allows only a very small quantity of liquid to flow through during the forcing back of the liquid; it provides near the partition a communication between the cylinder element A and the reservoir. As hereinafter described, the said orifice $a$ serves a certain purpose at the moment of the running out of the gun.

In the recoil, the cylinder elements A and B move past the two pistons E and F which are located respectively at the ends of a rod G which is shaped in such a manner as to present varying cross sections at different points of its length. The piston F is attached to the gun cradle H by means of a rod I which is simply guided in the upper end $B^1$ of the cylinder element B.

The whole of the cylinder A—B and reservoir D may be formed in or fixed to the gun slide which is suitably engaged with, or fastened to the gun barrel J in the usual manner. When at rest positions, the cylinder element A and also the cylinder element B communicating with the reservoir D are respectively full of liquid. The free level of this body of liquid is located in the reservoir D in which air or gas is confined under pressure.

In the recoil, the cylinder element B moves past the piston F and becomes filled at the rear of said piston, and to the extent possible, with the liquid that is forced out of the large bore element A.

The surplus amount of liquid that is unable to flow into the small bore element, passes through the duct $b$ into the reservoir D wherein it compresses the gas under pressure.

At the same time a braking action is produced in the recoil, due to the displacement of the partition C along the peculiarly shaped connecting rod G.

At the end of the recoil, the gun is run out by the force of the expansion of the gas in D. At the beginning, the liquid is able to flow only to an insufficient extent through the annular space which has then reached its minimum between the rod G and the sides of the partition. At this moment the small orifice $a$ allows of a sufficient flow of liquid to start the running out movement of the gun. Immediately afterward, the annular passage between the rod G and the partition increases so that the flow of liquid through $b$ and through the said passage, takes place in a normal manner to allow of the liquid flowing out of B toward A. It will be readily understood that the described conjugation between the brake and the recuperator allows of simplifying the construction and manufacture of the whole of these devices. On the other hand, as hereinbefore stated, the constant communication between the brake cylinder and the air reservoir of the recuperator, secures the full amount of liquid to the brake at all times, while allowing the said liquid to expand freely.

The checking of the level of the liquid in the reservoir D is sufficient to control both the brake and the recuperator as a whole.

In practice, the conjugated recuperator and brake will be combined with a moderator for regulating the running out of the gun into the firing position.

In the embodiment of this invention comprising a combination of this kind, illustrated in Figs. 2 to 4, the peculiarly shaped rod G which connects the two pistons E, F, is hollow, and its wall is pierced near the piston E with one or more small orifices $g$.

K is a counter rod which extends through a tight joint in the piston E and is fixed at its rear end to the rear end of the cylinder element A; it is provided at its front end with the usual valve L.

The operation of the illustrated moderator for regulating the running out of the gun into firing position is known. The liquid which was able in the recoil to flow freely through the orifices $g$ and through the valve L (when the latter is open) inside the rod G, flows slowly during the running out movement of the gun between the outside of the closed valve and the inside of the rod G.

In the embodiment shown in Figs. 2 to 4, it is assumed that the reservoir D comprises two portions as shown in Fig. 4 each comprising at the desired point a duct $b$ and a small orifice for establishing communication respectively with the cylinder elements B and A. For the purpose of charging these reservoirs with gas and liquid, a charging valve in the form of a needle valve M may be provided in the usual manner in the wall of one of these reservoirs D.

In the embodiment of the improved apparatus illustrated in Figs. 5, 6 and 7, a single air or gas reservoir surrounds over the desired length the double bore cylinder A—B. Communication between the element B and the reservoir is assured by a duct $b$ located outside the cylinder element B. This duct opens at one end $b^1$ preferably at the crown of the cylinder, and in any case near the partition C. The said duct opens at its front end $b^2$ at a point of the reservoir D that is always covered with liquid, whatever the inclination of the gun may be. Communication between the element A and the reservoir D is established as in the hereinbefore described examples, through the partition C and a small auxiliary orifice $a$ that is located near the said partition and is pierced preferably at the bottom of the said cylinder element. The manner of providing communication between the recuperator reservoir and piston cylinder herein shown and described, but not herein claimed, forms the subject-matter of claims in my copending application Serial No. 217,198 of even date herewith.

In practice, for the purpose of facilitating the removal of the valve L of the moderator, the communication orifices $g$ may be located between the cavity of the rod G and the cylinder element A as shown in the detail Fig. 8. In this case the orifices $g$, or only one such orifice, will establish communication through a passage $e$ formed in the piston E. $e^1$ is a needle valve for closing the communication between $g$ and $e$ when it is desired to remove the counter-rod K for the examination or repair of the valve L. By this means all discharge outside of the liquid under pressure in the recuperator is prevented.

What I claim is:—

1. In a combined recuperator and brake apparatus for guns, the combination of a fluid pressure reservoir, cylinders of different cross-sections one of which is open to said reservoir through the companion cylinder, pistons in said cylinders, a tapering piston-rod connecting said pistons and working through said opening between said cylinders and adapted to progressively throttle the flow of fluid between said cylinders during recoil.

2. In a combined recuperator and brake apparatus for guns, the combination of a fluid pressure reservoir, cylinders of different cross-sections one of which is open to said reservoir through said other cylinder, pistons in said cylinders having a tapering connection with each other for throttling the flow of fluid between said cylinders during recoil, and means for resisting the action of reservoir pressure on said pistons during return of the gun to battery.

3. In a combined recuperator and brake apparatus for guns, the combination of a fluid pressure reservoir, cylinders of unequal cross-section one of which is open to said reservoir through the other of said cylinders, pistons in said cylinders, a tapering piston-rod connecting said pistons and adapted to throttle the flow of fluid through said opening during recoil, said rod having a bore open to one of said cylinders, and piston means in said bore for throttling discharge of fluid therefrom during return of the gun to battery.

4. In a combined recuperator and brake apparatus for guns, the combination of a fluid pressure reservoir, cylinders of unequal cross-section one of which is open to said reservoir through the other of said cylinders, pistons in said cylinders, a tapering tubular piston-rod connecting said pistons and adapted to throttle the flow of fluid through said opening during recoil, said tubular piston rod having a valve controlled communication with its surrounding cylinder and piston means in said tubular piston-rod for throttling discharge of fluid therefrom during return of the gun to battery.

5. In a combined recuperator and brake apparatus for guns, the combination of a fluid pressure reservoir, tandem cylinders of unequal cross-section one of which is open to said reservoir through said other cylinder, pistons in said cylinders, a tapering piston-rod connecting said pistons and adapted to control flow of fluid through said opening between said cylinders during recoil of the gun.

6. In a combined recuperator and brake apparatus for guns, the combination of a fluid pressure reservoir, cylinders of unequal cross-section one of which is open to said reservoir through the other of said cylinders, connected pistons in said cylinders and means for controlling the flow of fluid through said opening between said cylinders during recoil of the gun.

In testimony whereof I have signed this specification.

EUGÈNE SCHNEIDER.

Witnesses:
 ANDRÉ MOSTICKER,
 CHAS. P. PRESSLY.

Copies of this patent may be obtained for five cents each, by addressing the "Commissioner of Patents, Washington, D. C."